(12) United States Patent
Loveland

(10) Patent No.: US 7,818,265 B2
(45) Date of Patent: Oct. 19, 2010

(54) SYSTEM AND METHOD FOR FACILITATING PROPERTY COMPARISONS

(76) Inventor: Damien Gerard Loveland, 5831 Musgrave Crescent, Richmond, BC (CA) V7C 5N6

( * ) Notice: Subject to any disclaimer, the term of this patent is extended or adjusted under 35 U.S.C. 154(b) by 151 days.

(21) Appl. No.: 11/602,097

(22) Filed: Nov. 21, 2006

(65) Prior Publication Data

US 2008/0120363 A1    May 22, 2008

(51) Int. Cl.
*G06Q 50/00* (2006.01)

(52) U.S. Cl. .................................... 705/313

(58) Field of Classification Search ........... 705/313, 705/306, 7, 10, 26, 27, 28, 400, 1.1
See application file for complete search history.

(56) References Cited

U.S. PATENT DOCUMENTS

| | | | |
|---|---|---|---|
| 5,414,621 A | 5/1995 | Hough | |
| 5,680,305 A | 10/1997 | Apgar, IV | |
| 6,141,648 A * | 10/2000 | Bonissone et al. | 705/10 |
| 6,178,406 B1 * | 1/2001 | Cheetham et al. | 705/10 |
| 6,609,118 B1 * | 8/2003 | Khedkar et al. | 705/36 R |
| 6,748,369 B2 * | 6/2004 | Khedkar et al. | 706/6 |
| 6,876,955 B1 * | 4/2005 | Fleming et al. | 702/194 |
| 7,305,328 B1 * | 12/2007 | Fleming et al. | 702/194 |
| 7,386,496 B1 * | 6/2008 | Braun et al. | 705/10 |
| 2001/0039506 A1 * | 11/2001 | Robbins | 705/10 |
| 2003/0101074 A1 * | 5/2003 | Suzuki et al. | 705/1 |
| 2003/0229504 A1 * | 12/2003 | Hollister | 705/1 |
| 2005/0154656 A1 * | 7/2005 | Kim et al. | 705/30 |
| 2006/0020424 A1 * | 1/2006 | Quindel | 702/183 |
| 2006/0075442 A1 * | 4/2006 | Meadow | 725/91 |
| 2006/0080113 A1 * | 4/2006 | Vandrilla | 705/1 |
| 2006/0089842 A1 | 4/2006 | Medawar | |
| 2007/0112757 A1 * | 5/2007 | Bates et al. | 707/5 |
| 2007/0198278 A1 * | 8/2007 | Cheng et al. | 705/1 |
| 2008/0301064 A1 * | 12/2008 | Burns | 705/400 |

OTHER PUBLICATIONS

Morton "Narrow Versus Wide Stratification of Data in the Development of Regression Appraisal Models", 1976, 12 pages.*

* cited by examiner

*Primary Examiner*—Igor Borissov

(57) ABSTRACT

A system and method allowing a user to quickly receive a ranked comparison of homes for sale based on default criteria or criteria of the user's choice. An interactive website is provided into which a home buyer can enter details of several properties under consideration for purchase and receive a ranked comparison list in order of best value for money. Homebuyers may change the weightings of the criteria according to their preferences. An alternate home price is calculated for the homes ranked below first such that they have the same perceived value per dollar as the top ranked home. Finally, there is an option for the homebuyer to share results with the online community.

20 Claims, 4 Drawing Sheets

| No. | OTHERS' RANK | OTHERS' SCORE/$ | YOUR RANK | YOUR SCORE/$ | ADDRESS | YOUR COMMENT | OTHERS' COMMENTS |
|---|---|---|---|---|---|---|---|
| 3 | 2 | 89 | 1 | 100 | 123 Big Rd | Quiet street | No buses . . . |
| 2 | 1 | 95 | 2 | 99 | 67 Low Rd | Nice View | Big garden . . . |
| 5 | 3 | 77 | 3 | 83 | 45 Tree Pl | Too isolated | Nice fireplace . . . |

SYSTEM AND METHOD FOR FACILITATING PROPERTY COMPARISONS

BACKGROUND OF THE INVENTION

When purchasing a home a prospective buyer will usually visit several different homes for sale, each with different asking prices and different features. A buyer in general wants the best value for money within a predetermined price range. Often, it becomes difficult to make a fair comparison to determine which home represents the best value for money based on the multitude of features associated with a home. One will usually end up with a disorganized pile of feature sheets with handwritten notes in various different places. In some cases, a must-have feature which the buyer requires may be forgotten if all the bits of paper become too disorganized. For example, in the rush of a busy market, or overwhelmed by the number of issues to be dealt with, one may forget, for example, that the home to be purchased should be within a short walk from a bus stop. It is also a pretty slow exercise to compare notes made in different formats. Furthermore, if the buyer's preferences change during the home buying process, then it becomes a time consuming process to manually compare and re-evaluate all the past notes.

Buyers may also be provided with recently completed, comparable home sales by real estate agents, which may be a selective list based on criteria such as the number of bedrooms, age and square footage. The general condition of maintenance and repair will generally not be one of the parameters. The selection of recently sold homes depends on the judgment of the real estate agent, and this choice may vary from agent to agent. Buyers are generally provided with a list of homes, usually on printed sheets, with no easy way to manipulate the information pertaining to the homes. Any comparison other than a general one is a paper exercise. Sometimes a home buyer will use a scorecard in the form of a table with homes across the top and features down the side. A sided by side comparison of homes is then possible.

The Internet can presently be used to help buyers. The ZipRealty website uses an electronic version of the side by side home comparison tool. The features of up to four homes can be compared side by side, on screen, but without any analysis.

The Trulia website lists homes for sale in a table format, and permits the homes to be listed in order of any of the features. There is also a rank associated with each home on the list, the rank indicating the neighborhood popularity of the home to which it refers, or the popularity with which the home is searched online.

The Internet can help buyers to value homes they are considering buying. For example, the Zillow website provides price estimates based on previous sales of similar homes in the same area. The estimate is drawn from a database of sales information, but the estimate generally does not take into account the condition of the homes, unless extra information is added. The accuracy claimed on this website is that most estimates are within 10% of the true market value, which means that on a $500,000 home, the estimate could be out by as much as $50,000. The notion of a true market value is an approximation anyway, because the desperation of a seller, the eagerness of a buyer or the strength of a good negotiator each may affect the ultimate selling price to the same amount. One drawback in estimating values this way is that the estimate is based on historical data, which may not bear much resemblance to current market data. This is the case particularly in a fast moving market or if the homes used for providing comparable values are too dissimilar from the one being considered for purchase.

U.S. Pat. No. 5,857,174 discloses a system for comparing a subject home for sale with homes that have recently been sold. The system allows sold homes, which are not similar to the subject home, to be used for the comparison, by first adjusting the sale prices of the sold homes to compensate for their differences. This would allow, for example, a four bedroom home to be used as a comparable for a three bedroom home.

U.S. Pat. No. 6,178,406 discloses a system for comparing a subject home for sale with homes that have recently been sold. The system allows sold homes, which are not similar to the subject home, to be used for the comparison, by first adjusting the sale prices of the sold homes to compensate for their differences. The system then selects the best matched recently sold homes to use as the comparables.

U.S. Pat. No. 5,141,621 is a system for comparing the value of a home for sale with recently sold homes based on a calculation involving the assessed taxation value of the homes.

US Patent Application Publication 2004/0254803 discloses a system for comparing different appraisals of the same subject home. Each of the appraisals is carried out using a different methodology, usually leading to a range of different appraised values for the same home for sale.

US Patent Application Publication 2005/0216292 is a system which can compensate for appraiser bias in the appraised value of a home for sale.

U.S. Pat. No. 6,115,694 is a computer implemented system of comparing a home for sale with comparable recently sold homes.

US Patent Application Publication 2003/0101074 discloses a tool for evaluating a real estate location taking into account social and environmental factors.

US Patent Application Publication 2006/0089842 discloses a system which can compare multiple subject homes for sale with recently sold homes. A different set of comparable sold homes is used for each subject home for sale. The system indicates which homes for sale are under priced and which are overpriced. Again, the comparisons are based on historic rather than current data.

There is no automated system in existence known to the inventor which facilitates and speeds up the task of comparison of homes for sale with each other during the home purchasing process, and which is flexible enough to be tailored to each individual home buyer's needs and preferences. While systems exist for the comparison of a home for sale with homes that have been recently sold, there is no system in place for the comparison of several homes for sale with each other.

There is a need for a convenient method for a home buyer to compare the homes under consideration for purchase, which is faster than manually comparing feature sheets. Further, there is a need to provide a more accurate analysis of a home's value, which is specific to each prospective purchaser. The aim of the current invention is to provide market value comparisons, which are more representative of current market demand rather than on what the market has to offer. The price valuations and comparisons are therefore based more on the wants, needs and assessments of prospective buyers rather than on the numerical values of the physical features and parameters of the homes offered for sale. The comparisons are not based on historical sales data, but instead are based on current market data.

SUMMARY OF THE INVENTION

The invention is a means to eliminate what is usually a tedious paper exercise. It allows a user to input details about homes for sale via a remote terminal, such as a computer connected to the Internet, and quickly receive a ranked comparison of those homes based on default criteria or criteria input by the user.

An algorithm stored on the server which drives the website lists the properties in order of best value for money based on a predetermined default set of criteria. Home buyers may change the weightings of the criteria according to their preferences, in which case the algorithm will provide a list of properties ranked according to how well they fit the newly weighted criteria. Home buyers may add comments against each home under consideration, for future reference. An alternate home price is calculated for the homes ranked below first such that they have the same perceived value per dollar as the top ranked home. Finally, there is an option for the home buyer to share the information with the online community.

DETAILED DESCRIPTION OF THE INVENTION

Basic Embodiment

For the purpose of clarity, the functionality of a basic embodiment of the invention will first be described in detail. In this embodiment, the criteria used to evaluate the homes will be the price, the covered area and the lot area. These may constitute the default criteria to be used by a user testing out the system for the first time, or for a user wanting only straightforward comparisons.

Figure 1:
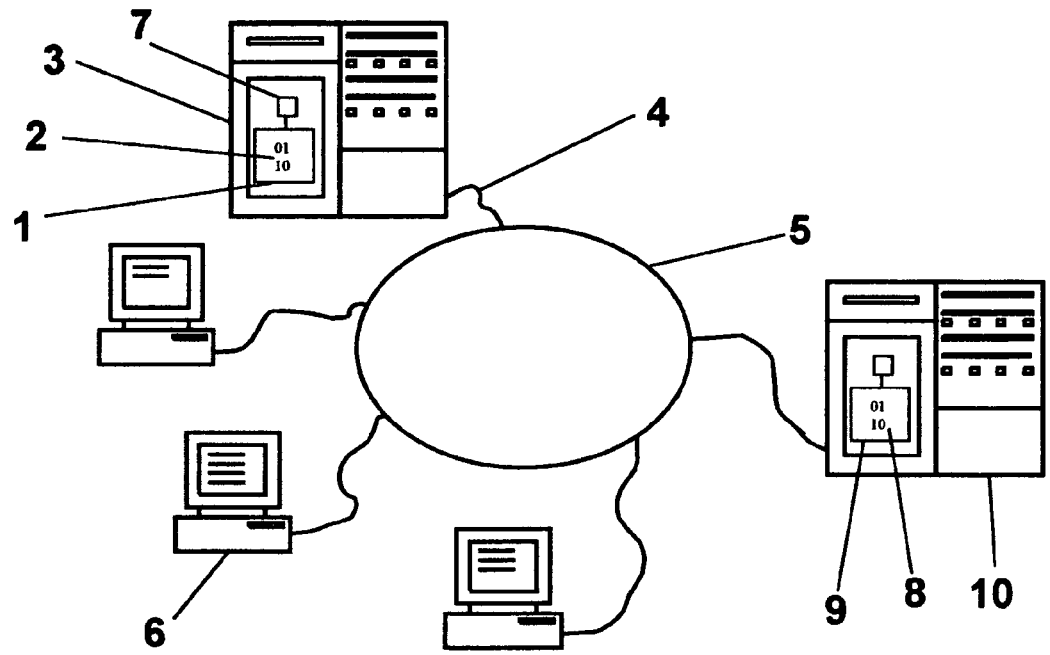
FIG. 1 shows a scheme of the hardware of the system

Referring to FIG. 1, the preferred embodiment of the invention requires a computer-readable medium 1 on which a series of computer-readable statements and instructions 2 are stored in the form of a program. The computer-readable medium is contained within a server 3 which is connected with a data carrying connection 4 to the Internet 5. Users of the system connect to the Internet via terminals 6, such as a personal computer, remote from the server and can provide inputs and information via these terminals, and view output from the program on the terminals. The output is produced by a processor 7 within the same or different server or elsewhere which acts on the computer-readable instructions and the inputs and information provided by the users. An additional database of computer-readable information 8 on a computer-readable medium 9 is optionally provided in a server 10, the same server 3 or elsewhere, the information being accessible by the program. A plurality of such databases may be provided for different types of data storage, or the different types of data may be stored in different tables within the same database. The program is written using known in the art methodology in one or more common computer programming languages known in the art such as PHP, MySQL and HTML and the output can be in the format of web pages, for example.

Figure 2:
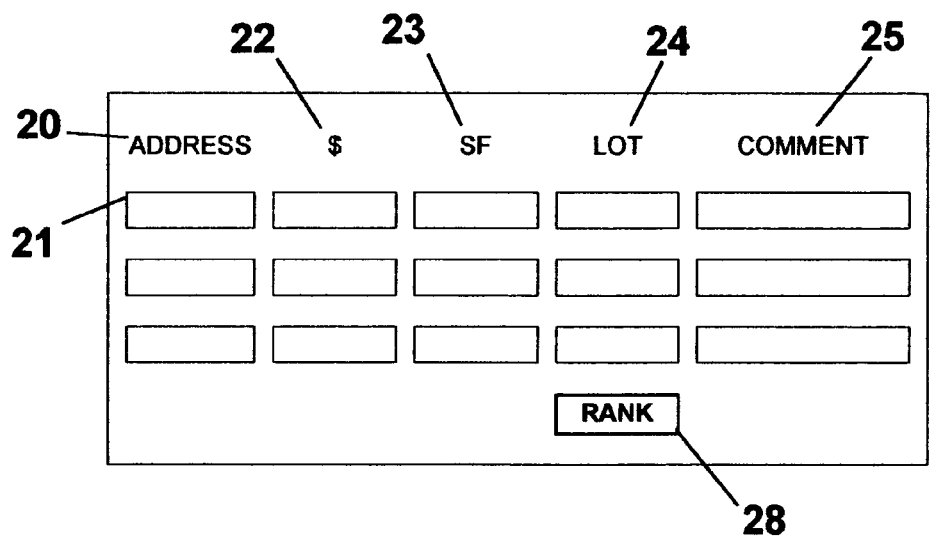
FIG. 2 shows an example of an initial input screen

The functionality of the invention will be explained in relation to the screens of information displayed on remote terminals 6 connected to the Internet. FIG. 2 shows the pertinent features of an example of an initial, partially completed input screen displayed on a user's terminal. The leftmost column 20 is labeled "Address" and comprises data entry fields 21 each for the user to enter the address of a property under consideration for purchase. To the right of this first column are further columns entitled "$" 22 for the asking price, "SF" 23 for the covered area in square feet, "Lot" 24 for the area of the lot in square feet and "Comment" 25. Each of these columns comprises data entry fields, for example 21 in which a home buyer can enter information pertaining to the homes under consideration for purchase. Personal comments relating to observations about each home can be entered in the "Comment" column 25, for example as and aid to memory or to note particular features of interest or detriment.

When information has been added for at least two homes, the user clicks on the on screen Rank button 28 to rank the list of homes. After temporarily storing the input data in a database, such as database 8, this causes the program to cause a screen such as the screen in FIG. 3, comprising a table of columns and rows, to be displayed. The information in a given row of the table relates to the home defined in the "Address" column 53. This column represents a suitable identifier of the property. As well, an image of the home may be displayed as a suitable identifier. The first column of the information displayed is entitled "Rank" 51 and comprises a list of integral numbers starting from 1. The second column 52 is entitled "Score/$" and the third column 58 is entitled "Score". The system causes the homes to be listed in order of best value for money, the first home being ranked as "1" and having the best value, the second home being ranked as "2" and having second best value for money, and so on. The rank is calculated according to a predetermined default algorithm described below, which the user can change if required. The "Score/$" column provides a more precise comparison of the homes than the rank, because it enables the user to see whether two homes of neighboring rank have similar or dissimilar values for money. To the right of the "Address" column are the columns for the asking price "$" 54, covered area in square feet "SF" 55, lot area in square feet "Lot" 56 and "Comment" 57.

The determination of rank and order of listing for the purposes of display requires several steps. The first step in the calculation is to determine the score. First, an intermediate value proportional to the score is calculated as $x_1$ for the first home on the list according to the equation:

$$x_1 = (0.8 c_1/C + 0.2 a_1/A) \qquad \text{Eq.1}$$

where $c_1$ is the covered area and $a_1$ is the lot area for the first home on the list. The average covered area for the homes being ranked is denoted C, and the average lot area is denoted A. The units of measurement should be the same for all the values a, A, c and C. When deciding which home to buy, buyers often attach more importance to the size of the home than the size of the lot on which it is built. In this particular form of the equation, the weighting attached to the size of the home is four times the weighting attached to the size of the lot. Using this algorithm, if the home is average in respect of covered area, lot area and price it will have $x_1=1$. All other things being equal, if the home has a covered area 100 sf greater than average it will have a value of $x_1$ above 1, which will be the same value as if the home had a lot size 400 sf greater than average instead.

The same calculation is repeated for the second home on the list, using covered area $c_2$ and lot area $a_2$ resulting in an intermediate value $x_2$. The calculations are evaluated for each of the n homes on the list, resulting in intermediate values $x_1$, $x_2, \ldots x_n$. These values are normalized to obtain the score for display purposes such that the maximum score is 100. This is done by multiplying all values by the same factor N, where $Nx_{max}=100$ and $x_{max}$ is the highest intermediate value calculated for the list of homes under consideration. The resulting scores are displayed to two significant figures, for example, on the screen in the "Score" column 58. Alternately, the normalized scores could be displayed to the nearest integer. A different maximum could be chosen. Other alternates are possible, for example, normalizing the scores such that the average is 100 or 10 or some other number.

The next step is the calculation of the score per dollar. This will allow the user to determine which homes have the best value for money. For the $i^{th}$ home in the list, the intermediate score per dollar $r_i$ is calculated as $r_i=x_i/p_i$ where $p_i$ is the asking price and $x_i$ the intermediate value for the score of the $i^{th}$ home on the list. The intermediate scores per dollar are calculated for all homes on the list, and the resulting values $r_1, r_2, \ldots, r_n$ are normalized such that the maximum value is 100 for display purposes. This is done by multiplying all values by the same factor M, where $Mr_{max}=100$ and $r_{max}$ is the maximum score per dollar calculated for the list of homes under consideration. The normalized per dollar scores are listed in the "Score/$" column 52. Again, these can be displayed to two significant figures, to the nearest integer or in any other fashion suitable for clarity of display. They may also be scaled to a different maximum.

The third and final step in the basic embodiment of the invention is to rearrange the list of homes in order of descending score per dollar, and give each home a ranking starting from 1 for the home with the highest score per dollar and increasing by 1 as the list is descended. If two or more homes have the same score per dollar they will be given the same rank. The next ranked home may have the next higher rank number or it may have the rank number it would have if all the homes above it had different ranks.

Column 63 "Ideal $" shows adjusted prices for the homes ranked below first. The adjusted prices represent what the asking prices would be if the homes had the same score per dollar as the top ranked home. The adjusted price for the $i^{th}$ home on the list this is equal to $p_i(r_i/r_{max})$.

Below the rows of data for the homes there may optionally be one or more empty rows 81 for the addition by the user of information for more homes under consideration. Once the additional data is entered, the user clicks on the Refresh button 59 which will cause the program to recalculate the scores and rankings of the increased number of homes under consideration.

At any time during the process the information can be saved in a database 8, by clicking the mouse on the Save button 64, and the user can return at a later time to complete the information or add details of more homes. This may be done using a login and password procedure. The save feature may be an optional feature.

By clicking on the title of a column, such as "Rank" 51, "Score/$" 58, "Score" 52 or "$" 54, or other columns, the homes can be alternately reordered according to decreasing or increasing values in that column.

In the example comparison displayed, the home with the higher asking price has a higher score, but it has a lower per dollar score than the cheaper home. Such a result would not be quickly evident by looking at feature sheets for the homes.

In the basic embodiment, the user will only make comparisons of similar homes, such as those homes having the same number of bedrooms or a certain age, for example. The user should pre-filter the selection of homes such that information relating only to a group of similar homes is entered in order to obtain a realistic comparison. The ranked comparison list will not take into account any difference in value based upon the number of bedrooms or bathrooms for example.

Adjustment of Parameter Weightings

Figure 3:
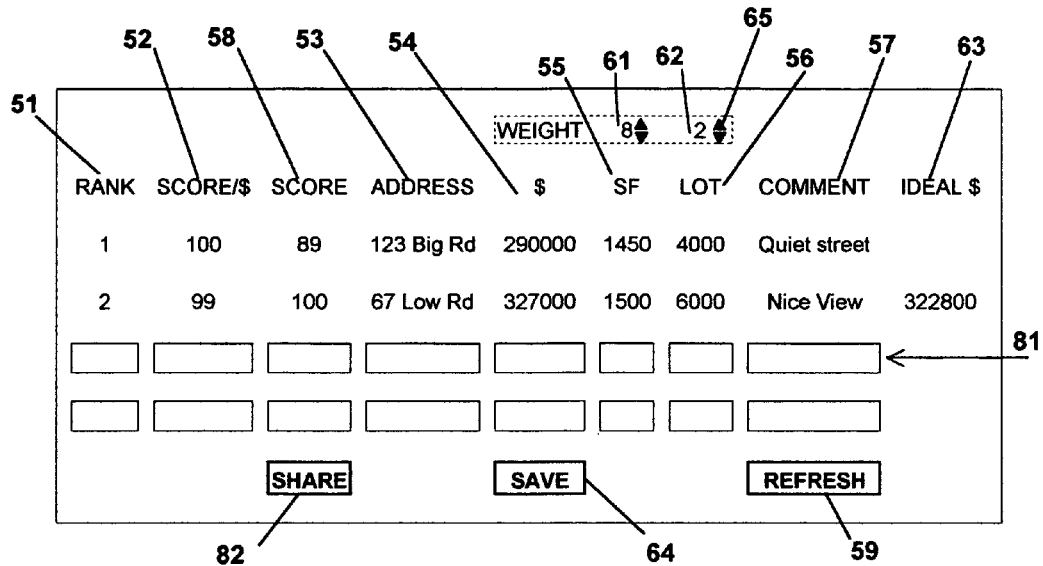
FIG. 3 shows an example output screen display

The first step in making a more sophisticated comparison is for the user, after an optional signing on stage, to adjust the parameter weightings used to compare the homes. For example, the lot area may be of much greater importance for someone who has kids aspiring to be soccer stars and the covered area may be of greater importance to those who dislike gardening. In the former case, the weighting factor for the lot area might be 10 and in the latter case it might be 0. Referring to FIG. 3, item 61 represents the weighting of the covered area parameter. For example, the number 8 as displayed may correspond to the value of 0.8 in Eq. 1. Likewise, item 62 represents the weighting of the lot area parameter, and its value of 2 corresponds to the value of 0.2 in Eq. 1. Different relationships can be used between the displayed weighting parameter and the actual one used for calculation, depending on the factors used in Eq 2 and the level of clarity required for ease of use by the user. The user can alter these weightings by clicking on the up and down arrows or triangles 65 displayed alongside the parameter weighting values. Once the parameter weightings have been changed, the user clicks on the Refresh button 59 causing the evaluations of score, score per dollar and rank to be recalculated.

Advanced Embodiment

The first step in making a more sophisticated comparison is for the user, after an optional signing on stage, to compare the homes with more criteria. In addition to covered area and lot area, the additional criteria could be number of bedrooms, number of bathrooms, number of garages, number of parking spaces, proximity to schools or bus stops, age, quality of view, quality of neighborhood or any other feature of a home, or any selection or combination of these. The user would then rate the importance of each criterion by setting the corresponding parameter weighting accordingly.

Figure 4:
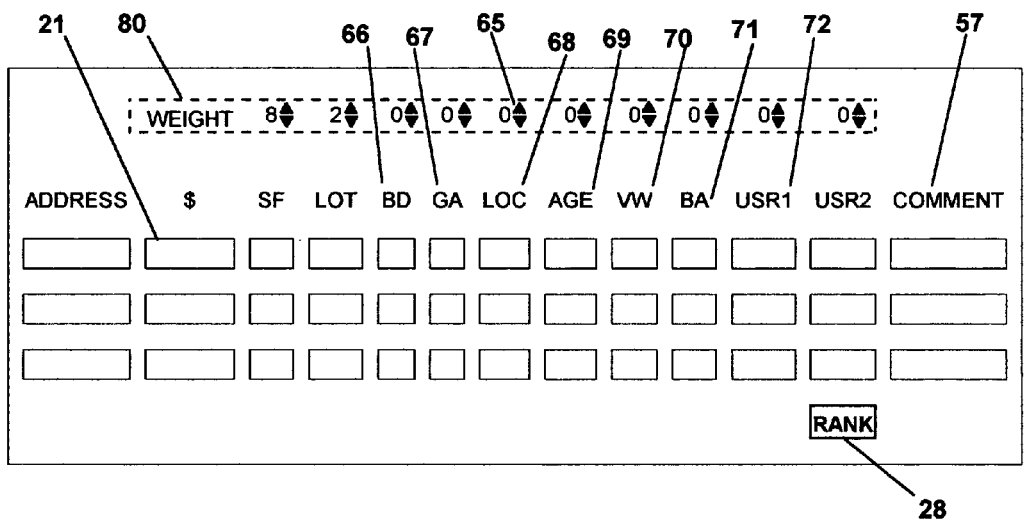
FIG. 4 shows an example of an input screen of an advanced embodiment

Referring to FIG. 4 we see an example of an input screen for the advanced embodiment displayed on the terminal of a remote user. It is similar in basic functionality to the system of FIG. 2 except in two respects. The first is that there are more parameters, namely number of bedrooms "BD" 66, number of garage spaces "GA" 67, quality of location "LOC" 68, "Age" 69, view "VW" 70 and number of bathrooms "BA" 71. Each parameter has a corresponding, adjustable parameter weighting value, adjustable using up and down triangles 65. The second advanced feature is the inclusion of one or more user defined parameters, for example "USR1" 72, each with corresponding, adjustable parameter weighting values.

In this embodiment, the user will need to enter a value from 0-10 to rate the qualitative parameters of a home, such as the quality of the location 68 or the quality of the view 70.

Once the addresses and values have been entered into the data entry boxes 21 and the weighting values 80 for the criteria have been set, the user clicks on the Rank button 28. Intermediate values proportional to the scores are calculated for each home on the list entered by the user according to the equation for the $i^{th}$ home:

$$x_i = [w_c c_i/C + w_a a_i/A + w_b b_i/B + w_g g_i/G + w_p p_i/P + 2w_y \exp(-0.693 y_i/Y) + \ldots] \quad \text{Eq. 2}$$

In this equation, the weightings of the parameters are represented by w with a subscript denoting a specific parameter. Subscripts c and a represent the covered area and lot area parameters as above. Further, for example, $w_g$ is the weighting for the number of garage spaces, $g_i$ is the number of garage spaces for the $i^{th}$ home on the list and G is the average number of garage spaces for all the homes on the list. In a similar way, $p_i$ can represent the quality of the location of the $i^{th}$ home, P the average quality of location, $b_i$ the number of bedrooms of the $i^{th}$ home and B the average number of bedrooms. The age in years of the $i^{th}$ home is $y_i$ and the average age is Y, and the term for the contribution to the score from the age is different from all the other parameters because a lower age needs to represent a higher score. The term for the age is set such that it equals $w_y$ for a home of average age, in line with the terms for the contributions to the score from other parameters. More terms corresponding to more parameters may be added depending on the complexity required.

The next step is then to calculate the score per dollar as in the basic embodiment, determine the ranking positions of the homes and display the results on the screen of the user's remote terminal.

Again, at any time during the process the information can be saved and the user can return at a later time to complete the information, add details of more homes, or amend the weighting of the criteria used for ranking.

The information for a given home may be so much that it may be displayed on more than one row for clarity of display.

Further Advanced Embodiment

In the embodiments disclosed so far it has been generally assumed that a larger value of feature represents a better value for money for the home buyer. While larger features are usually related to higher asking prices and larger taxes, they do not necessarily represent a higher value for money for the home buyer. Different home buyers will value homes differently, so it is an object of this further advanced embodiment to introduce additional flexibility into the contribution from each parameter to the score calculated for each home.

For example, the above algorithms will generally increase the score of a home in line with the numerical value of each parameter, except of course for the age. While increasing lot size may well represent a greater theoretical value per dollar, all other thing being equal, there comes a point when the lot may be considered too large and unmanageable in terms of maintenance.

In this, the best embodiment of the invention, the user is able to input a preferred value of a parameter. For example, a user may have a preferred lot size of 6000 square feet. Homes which have 6000 sf lots will have scores with a maximum contribution from the lot parameter, subject of course to the weighting of that parameter. Homes with lots which differ from 6000 sf, whether positively or negatively, will have scores with a reduced contribution from the lot size parameter. The greater the difference, the more the contribution will be reduced.

To add another parameter for controlling the score, maximum and minimum values for each criterion can be inputted. To refine the above example, the preferred lot size might be 6000 sf, but the desired limits may be 4000 sf and 8000 sf. Homes with lot sizes outside these limits will be given a zero score or dose to zero score. Homes with lot sizes within the desired range will be given a score contribution proportional to how dose the lot size comes to the preferred value. The dependence does not necessarily have to be proportional, but may be quadratic or some other dependence.

Figures 5, 6:
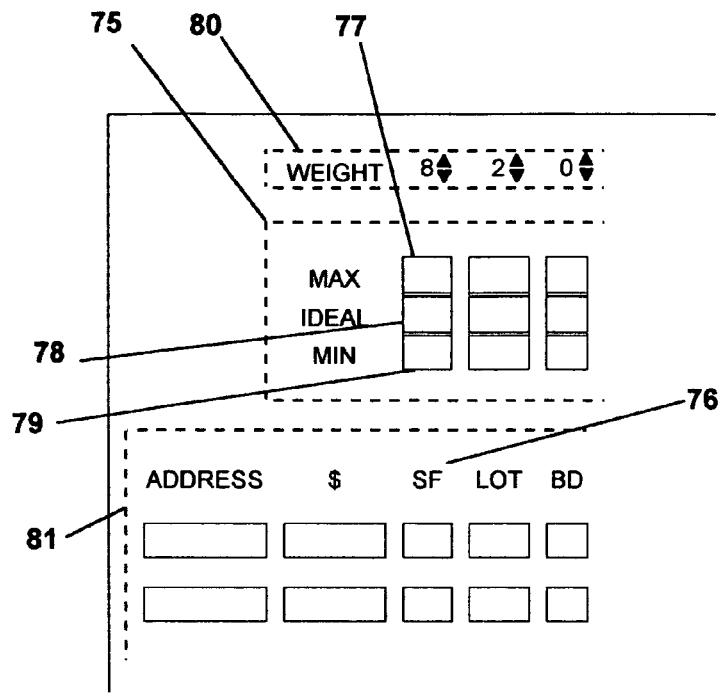
FIG. 5 shows a partial view of an input screen of another advanced embodiment
FIG. 6 shows a partial view of a screen capable of displaying shared information

Referring to FIG. 5 we see a partial input screen display similar to the one shown in FIG. 4, except that there is an additional zone 75 for inputting extra parameter controls. Consider the column labeled "SF" 76. Above the label the user will enter the maximum desired covered area in square feet (sf) in box 77, the ideal covered area in box 78 and the minimum covered area in 79. Similar entries can be made for all the other parameters. The program, when subsequently calculating the scores of the homes in the user's list, will assign a maximum contribution to the score for homes with ideal values of the parameters, and assign a lower contribution for homes with non-ideal values, irrespective of whether the values are higher or lower than ideal.

For example, each term, including the age contribution term, in Eq 2 can be replaced with a term as follows:

$$w_a[1 - |(a_i - A_{id})|/A_{id}][2A_{id}(a_{max} - a_{min})/((A_{id} + a_{min})(A_{id} - a_{min}) + (3A_{id} - a_{max})(a_{max} - A_{id}))]$$

In this equation, $w_a$ is the weighting for the covered area parameter $a_i$ of the $i^{th}$ home on the list, $a_{min}$ is the minimum desired covered area and $a_{max}$ is the maximum, as set by the user. The part of the term in the first set of square brackets is an inverted-V function. It uses the modulus of the difference between $a_i$ and the ideal value of the covered area $A_{id}$ to determine the magnitude of the fractional difference between the two values. This term is a measure of how close to ideal the value $a_i$ is. The part of the term in the second square brackets is a correction factor. It compensates for the variable effective reduction in weighting due to the inclusion of the modulus term in Eq. 3.

The maximum $a_{max}$ and minimum $a_{min}$ values of the covered area parameter are included as follows. Once an intermediate score for the $i_{th}$ home on the list has been obtained by an equation containing terms such as that shown in Eq 3, the score is multiplied by a value given by a function $f_a(z)$, where $f_a(z) = 0.1$ for $z < a_{min}$ and $z > a_{max}$ and $f_a(z) = 1$ for $a_{min} \leq z \leq a_{max}$. Likewise, the score is multiplied by other similar step or top-hat functions $f_b$, $f_g$, and $f_c$ etc each which reduce the so far calculated intermediate value for the score by a factor of 10 if the parameter of the function is outside the minimum and maximum ranges set by the user. The factor by which the intermediate value for the score is reduced does not necessarily have to be 10, but could be some other value, or it could reduce the intermediate value for the score to zero. Further, the user does not have to specify all or even any of the maximum, minimum and ideal parameter controls. The ideal may also be equal to either the maximum or the minimum. Also, the minimum may equal the maximum, for example when referring to a parameter such as the number of bedrooms.

Sharing Results

In any of the embodiments the user may optionally click on a button Share 82 which will cause the displayed home data, including rankings, scores and per dollar scores, to be stored in a database in a computer readable format 8 on a computer readable medium 9 such as a hard disk, in a server 10, and identified such that the information may be provided to other users of the system. The information stored may comprise addresses, calculated scores, rankings, mathematical operations on these and comments entered by the user, and the user may have the option to share none, some or all of the data. The database contains similar information entered by other users. On clicking the Share button 82, the program will cause a shared results screen to be displayed, such as that shown in FIG. 6. In this figure, the user's ranks are shown in column 51, as before, as well as the previously calculated per dollar score 52. Other parameters of the homes are also displayed for reference, in columns 53 and 57, as previously described. An additional column 31 is labeled "No.", showing the number of other users who have ranked each home. Column 33, "Others' Score/$" gives the average per dollar score as calculated for other users, and column 32, "Others' Rank" is the rank for each home as calculated from other users' average per dollar score. Column 32 may optionally be omitted in another embodiment. Column 34 "Others' Comments" contains comments written by other users. Depending on the amount of information in this column, it may be displayed as a scrollable box of text, or a link may be displayed which, when clicked on or when passed over by a mouse, causes a new browser window to open in which the comments are displayed, or a pop-up.

Functionality

Figure 7:
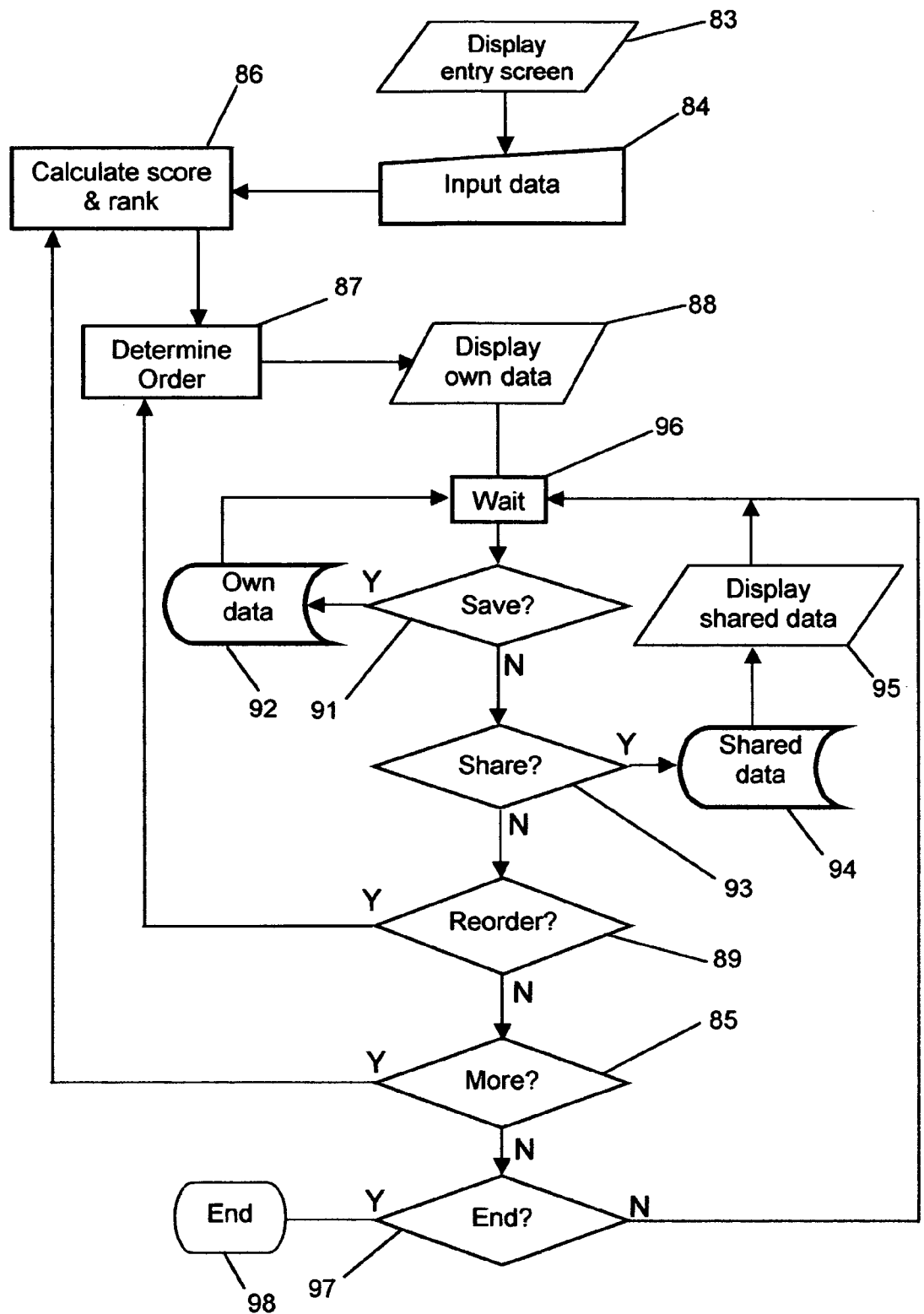
FIG. 7 shows a flowchart of the functionality of the system

The functionality of the system is best described in reference to the flowchart in FIG. 7. The system is started in step 83 when a user requests the data entry screen to be displayed, either by typing in the appropriate address in the address bar of an Internet browser, or by clicking on a hyperlink linking to the data entry screen. The user then types in information into the various entry fields in step 84. When the Rank button is pressed, the program proceeds to step 86 in which the program calculates the scores, scores per dollar and rankings for the list of homes entered by the user. In step 87, the program determines the order in which the results should be displayed, and orders the data accordingly. The homes, in the desired order, are displayed on the users remote terminal in step 88. The program then waits 96 until the Share, Save or Refresh button is pressed or a request for reordering is received by the user clicking on the title of one of the columns. If the Save button has been pressed 91, the data entered by the user is stored in a database 92 and the program returns to waiting 96 for an instruction to be provided by the user. If the Share button has been pressed 93, the program stores the information in a shared information database 94, displays shared information from other users in step 95, and then proceeds to the wait step 96. If one of the headings of the columns has been clicked, corresponding to a request 89 from a user to re-list the homes in an increasing or decreasing order of values in that column, the program proceeds to step 87 in which the homes are reordered. If, for example, the homes are not ordered according to the values in the column clicked, the program in step 87 will order them from highest to lowest. If they are already ordered, the program will cause them to be reordered in the opposite sense of their existing order. The re-ordered homes are then displayed in step 88. If the Refresh button is pressed, indicating 85 that there are more homes to be ranked, the program proceeds to the recalculation of scores and rankings 86. If a logout instruction is received, or no instruction is received after a predetermined time, the program interprets this as an End instruction 97, following which the program proceeds to the End step 98. If an End instruction is not received, the program proceeds to the Wait step 96. The steps or the loop through which the program functions is also broken when the user leaves the web page or closes the Internet browser.

Other Embodiments

The website may incorporate or have access to a pre-existing list of homes for sale, which will save the home buyer entering full details. A user may select homes from a displayed list, either before or after carrying out a search. Data is entered automatically in the data entry fields 21 etc. The homes may also be selected on a third party website which will then transfer the data to the data entry fields.

It is possible to have a different default algorithm for each type of property. For example, the algorithm for an apartment will not take into account lot size, but may take building management fees into account. As another example, the algorithm for comparing townhouses may have a stronger weighting for the covered area than the lot area.

The terminal used for inputting the data and viewing the results may not necessarily be remote, nor physically connected to the internet, but instead wirelessly connected. It may be a personal computer, laptop computer, personal digital assistant, cell phone or other electronic device capable of processing computer-readable instructions stored on or in a computer readable medium such as, for example, a CD-ROM or memory stick.

User names and passwords may be included as a feature to restrict use of some or all of the system to certain users.

A column may be optionally added to the result page which will allow the user to input alternative values for the homes which are based on comparables. These values may be determined by the user, they may be provided by real estate agents, or they may be provided by a third party website. In one embodiment, the program is configured to automatically display the comparable based values using information of home addresses, home parameters and recent sales stored in a database to which it has access.

Other scaling factors may be used in the equations. Variants of the terms within the equations may be used. Functional dependencies may be exponential, logarithmic, quadratic, polynomial, gaussian or any combination of these or other mathematical functions. Any selection of parameters by which a home may be compared may be used, including frontage, gardens, state of repair, state of maintenance, number of parking spaces, number of dens, number of games rooms, number of in-law suites, assessed taxes, proximity of schools, proximity of public transport, proximity of stores, proximity of health care facilities, proximity of highways, aspect (i.e. the orientation as determined by a compass) or any user defined attribute. As an example, the lot area will not be considered when comparing apartments, but the quality of shared amenities may be included.

The date of data entry may be recorded and stored if required. Dates of data entry may also be displayed on the screen of a remote terminal.

Details of saved information for homes may be edited or deleted.

The above description of embodiments is not limiting, as variations and modifications may be made by one of ordinary skill in the art without departing from the scope of the invention.

The invention claimed is:

1. A processor implemented method for evaluating real estate properties with respect to each other comprising the steps of:
   a. receiving, via a terminal connected to the processor, first input that identifies two or more properties which are for sale;
   b. receiving numerical values of two or more parameters for each of said two or more properties;
   c. receiving a numerical weighting factor for each of said two or more parameters;
   d. calculating by the processor, from received numerical values, an average numerical value of each of said two or more parameters; and e. calculating by the processor, for each of said two or more properties a score comprising:
two or more terms each related to a different of said two or more parameters; and
a summation of said two or more terms;
wherein, for the score for a first of said two or more properties:
each term is proportional to the numerical weighting factor for the parameter to which the term relates;
at least one term is proportional to the numerical value of one of said two or more parameters for the first of said two or more properties; and
said at least one term is inversely proportional to the average numerical value of said one of said two or more parameters.

2. The method according to claim 1 further comprising the step of displaying a representation of the scores on the terminal.

3. The method according to claim 1 wherein said two or more parameters are selected from the group consisting of frontage, lot area, covered area, age, number of bedrooms, number of bathrooms, quality of location, quality of view, gardens, state of repair, state of maintenance, number of parking spaces, number of dens, number of games rooms, number of in-law suites, assessed taxes, proximity of schools, proximity of public transport, proximity of stores, proximity of health care facilities, proximity of highways, aspect and an attribute defined by a user.

4. The method according to claim 1, wherein the receiving of a numerical weighting factor for at least one of said two or more parameters occurs via the terminal.

5. The method according to claim 1 further comprising the steps of:
receiving an asking price for each of said two or more properties;
calculating for each of said two or more properties a per dollar score by dividing each score by the corresponding asking price; and
displaying a representation of the per dollar scores on the terminal.

6. The method according to claim 1 further comprising the steps of:
receiving an asking price for each of said two or more properties;
calculating for each of said two or more properties a per dollar score by dividing each score by the corresponding asking price;
calculating an alternate price for one of said two or more properties by dividing the score for said one of said two or more properties by the highest per dollar score; and
displaying a representation of the alternate price on the terminal.

7. The method according to claim 1 further comprising the steps of:
receiving, via a further terminal remote from the processor, second input that identifies two or more properties which are for sale including a property that is common to the first input;
calculating a further score for the common property based on the second input;
calculating an average score for the common property from the score for the common property and the further score for the common property; and
displaying a representation of the average score on at least one of the terminal and the further terminal.

8. A system for evaluating real estate properties for sale with respect to each other comprising:
a processor and a terminal connected to the processor, the processor configured to:
a. receive, via the terminal, first input that identifies two or more properties which are for sale;
b. receive numerical values of two or more parameters for each of said two or more properties;
c. receive a numerical weighting factor for each of said two or more parameters;
d. calculate, from received numerical values, an average numerical value of each of said two or more parameters; and
e. calculate for each of said two or more properties a score comprising:
two or more terms each related to a different of said two or more parameters; and
a summation of said two or more terms;
wherein, for the score for a first of said two or more properties:
each term is proportional to the numerical weighting factor for the parameter to which the term relates;
at least one term is proportional to the numerical value of one of said two or more parameters for the first of said two or more properties; and
said at least one term is inversely proportional to the average numerical value of said one of said two or more parameters.

9. The system according to claim 8 further configured to display a representation of the scores on the terminal.

10. The system according to claim 8 wherein said two or more parameters are selected from the group consisting of frontage, lot area, covered area, age, number of bedrooms, number of bathrooms, quality of location, quality of view, gardens, state of repair, state of maintenance, number of parking spaces, number of dens, number of games rooms, number of in-law suites, assessed taxes, proximity of schools, proximity of public transport, proximity of stores, proximity of health care facilities, proximity of highways, aspect and an attribute defined by a user.

11. The system according to claim 8, further configured to receive a numerical weighting factor for at least one of said two or more parameters via the terminal.

12. The system according to claim 8, further configured to:
receive an asking price for each of said two or more properties;
calculate for each of said two or more properties a per dollar score by dividing each score by the corresponding asking price; and
display a representation of the per dollar scores on the terminal.

13. The system according to claim 8, further configured to:
receive an asking price for each of said two or more properties;
calculate for each of said two or more properties a per dollar score by dividing each score by the corresponding asking price;
calculate an alternate price for one of said two or more properties by dividing the score for said one of said two or more properties by the highest per dollar score; and
display a representation of the alternate price on the terminal.

14. The system according to claim 8 comprising a further terminal remote from the processor, the system configured to:
receive, via the further terminal, second input that identifies two or more properties which are for sale including a property that is common to the first input;
calculate a further score for the common property based on the second input;

calculate an average score for the common property from the score for the common property and the further score for the common property; and display a representation of the average score on at least one of the terminal and the further terminal.

15. The system according to claim 8, further configured to:

normalize the scores for said two or more properties to result in normalized scores; and display a representation of the normalized scores on the terminal.

16. The system according to claim 8, further configured to receive a numerical value of at least one of said two or more parameters via the terminal.

17. The system according to claim 8, further configured to receive via the terminal a further input representing a range for a first of said two or more parameters, wherein the term related to the first of said two or more parameters is higher when the numerical value of the first of said two or more parameters is within the range than when the numerical value of the first of said two or more parameters is outside the range.

18. The system according to claim 8, further configured to receive via the terminal a further input representing a user's desired value for a first of said two or more parameters, wherein the term related to the first of said two or more parameters is highest when the numerical value of the first of said two or more parameters is equal to the user's desired value.

19. A system for evaluating real estate properties for sale with respect to each other comprising:

a processor and a terminal connected to said processor, the processor configured to:

a. receive, via the terminal, first input that identifies two or more properties which are for sale;

b. receive numerical values of one or more parameters for each of said two or more properties;

c. calculate, from received numerical values, an average numerical value of each of said one or more parameters;

d. calculate for each of said two or more properties a score comprising:

one or more terms each related to a different of said one or more parameters; and a summation of said one or more terms;

wherein, for the score for a first of said two or more properties:

at least one term is proportional to the numerical value of one of said one or more parameters for the first of said two or more properties; and said at least one term is inversely proportional to the average numerical value of said one of said one or more parameters;

e. normalize the scores such that one of the scores or an average of the scores is equal to a predetermined value;

f. accept, via the terminal, second input representing a user's permission to display a representation of the normalized scores on a further terminal used by a further user; and g. output, via the further terminal, a representation of one or more normalized scores.

20. The system according to claim 19 wherein said one or more parameters are selected from the group consisting of frontage, lot area, covered area, age, number of bedrooms, number of bathrooms, quality of location, quality of view, gardens, state of repair, state of maintenance, number of parking spaces, number of dens, number of games rooms, number of in-law suites, assessed taxes, proximity of schools, proximity of public transport, proximity of stores, proximity of health care facilities, proximity of highways, aspect and an attribute defined by a user.

* * * * *